United States Patent Office 3,472,670
Patented Oct. 14, 1969

3,472,670
PROCESS FOR THE MANUFACTURE OF SHAPED STRUCTURES FROM REGENERATED CELLULOSE TRANSPARENTLY COLORED WITH ORGANIC DYESTUFFS
Horst Nobs, Reinach, Basel-Land, Switzerland, assignor to Ciba Limited, Basel, Switzerland, a Swiss company
No Drawing. Continuation-in-part of applications Ser. No. 507,519, 507,581, and Ser. No. 507,560, Nov. 12, 1965. This application Jan. 23, 1968, Ser. No. 699,762
Claims priority, application Switzerland, Nov. 12, 1964, 14,630/64, 14,631/64, 14,632/64
Int. Cl. C08b 21/20; C09j 1/02
U.S. Cl. 106—164                                   11 Claims

ABSTRACT OF THE DISCLOSURE

A process for the production of transparent, colored, shaped articles from regenerated cellulose, which comprises submitting to precipitation and shaping a viscose composition to which has been added previously a solution containing a dyestuff, a water-soluble non-ionic emulsifier and, optionally, an organic solvent for the dyestuff.

The dyestuff is soluble in an organic solvent miscible with water to any desired degree and is selected from the group consisting of organic metal-free dyestuffs with low solubility in water or of 1:2 metal-complex azo dyestuffs which are at most dispersible in water or of water dispersible metal phthalocyanine dyestuffs with the metal being selected from the group consisting of Cu, Co, Ni.

The water-soluble non-ionic emulsifier contains up to 50% of water and the weight ratio between dyestuff and emulsifier is between 1:2 and 1:50.

The organic solvent, which is used if the emulsifier is not the only solvent for the dyestuff, is miscible with water in all proportions and chemically inert to the viscose.

CROSS-REFERENCE TO RELATED APPLICATIONS

This application is a continuation-in-part of my applications Ser. No. 507,519, filed Nov. 12, 1965, Ser. No. 507,581, filed Nov. 12, 1965 and Ser. No. 507,560, filed Nov. 12, 1965, now all abandoned.

BACKGROUND OF THE INVENTION

This invention relates to a process for the manufacture of transparent, shaped structures from regenerated cellulose, colored with organic, difficultly water-soluble dyestuffs.

It is already known to dye shaped structures based on regenerated cellulose by means of dispersed pigments, in the course of the production process. The dyeings so obtained admittedly have excellent fastness properties but are far behind bath dyeings in respect of their brilliance. There is therefore, both in the fibre and in the film field, great interest in dyestuffs which may be used as pigment preparations and which give brilliant dyeings simultaneously with good fastness properties in use.

The process has also been described according to which fat-soluble dyestuffs are dissolved in solvents which are not miscible with water, such as benzene or chlorobenzene, and are stirred into viscose either directly or together with an emulsifier. The dyeings so obtained however are no different from pigment dyeings in respect of their gloss, but show considerably poorer fastness properties in use.

A process for the preparation of transparent, colored, shaped articles based on regenerated cellulose has now been found which avoids the disadvantages discussed above.

SUMMARY OF THE INVENTION

In this process a viscose solution is subjected to precipitation and shaping to which has been added previously a solution containing: (A) an organic dyestuff which is soluble in an organic solvent miscible with water to any desired degree and selected from the groups consisting of organic metal-free dyestuffs which are of low solubility or practically insoluble in water, 1:2 metal-complex azo dyestuffs which are at the most dispersible in water and which do not contain free —SO$_2$H, —COOH and —SO$_2$NH-acyl groups or more than one —SO$_2$NH$_2$ group, and of water dispersible metal phthalocyanine dyestuffs with the metal being selected from the group consisting of Cu, Co and Ni, (B) a water-soluble non-ionic emulsifier, which optionally contains up to 50% water, and optionally (C) an organic solvent for the dyestuff which is miscible with water in all proportions and which is chemically inert towards viscose.

By the term chemically inert solvents there are to be understood, within the framework of the present invention, such solvents as (a) do not react the alkaline components of the viscose or (b) which do not have a disturbing effect on the equilibrium reaction between CS$_2$ and the cellulose alcoholate. Normally one is here dealing with organic compounds which have neither a pronounced acid nor a pronounced alkaline character.

According to a variation of the process of the invention the water soluble emulsifier B can simultaneously be the solvent C which is miscible with water in all proportions.

The present invention is in principle applicable to all organic dyestuffs which meet the requirements listed under A. As far as industrial practice is concerned only a small selection of this large number of theoretically usable dyestuffs may be considered since naturally only such dyestuffs are of practical interest as simultaneously exhibit a whole series of fastness properties such as light fastness, wet fastness, resistance to bleeding etc.

The term "dyestuffs which are practically insoluble in water" is within the framework of this invention to be understood in the same way as in the usual langauge usage of dyeing technology practice. In most cases these solubilities correspond to a degree of solution of preferably less than about 0.5 g./l. in water at 20° C., these solubility data being related to the form in which the dyestuffs are applied (thus for example to the amine salts in the case of wool dyestuffs which are in themselves soluble).

Thus as long as organic dyestuffs fulfill the conditions named above, such dyestuffs may be used for the process of the invention if taken from the most varied classes of dyestuffs.

Dyestuffs of interest within the framework of the present invention are dispersion dyestuffs of the anthraquinone series and nigrosines, with preferential consideration again being given, within the first class of compounds, to such types as are free of free —SO$_3$H and —COOH groups. Typical representatives of this class of compounds which may be quoted by way of example, without limitation thereof, are:

(1) Anthraquinone dyestuffs containing the structural elements:

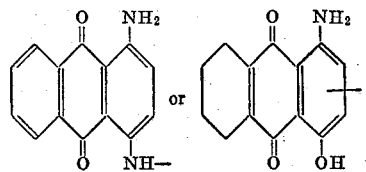

as long as they are free of —COOH and SO$_3$H groups.

(2) Anthrone derivatives which are free of free —SO$_3$H and —COOH groups, but which may optionally contain acylamino groups.

(3) Azine dyestuffs, particularly of the induline group, and nigrosines.

Metal-complex dyestuffs belonging to the azo-compound class that are suitable for the present process correspond, for example, to the following types:

(1)
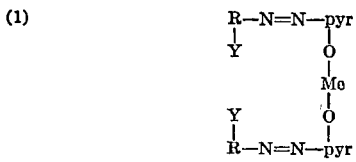

in which Me represents a divalent metal, preferably Co or Cr, pyr—O— represents the residue of a 5-hydroxy-2-pyrazoline. R represents the residue of a diazotizable arylamine and each Y, singly, represents a hydrogen atom or the two symbols Y as one unit represent a second disazo group of the formula

(2) Metal-complexes of azo dyestuffs containing the grouping:

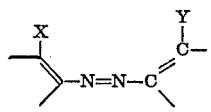

in which X and Y represent a function participating in complex formation, for example, a hydroxyl group, a carboxyl group or an amino group.

(3) Products obtained by reacting simple aliphatic amine bases or guanidine compounds with 1:2 metal-complex compounds of monoazo dyestuffs free from sulphonic acid groups and groups not in ortho-position to an azo group.

(4) Products obtained by reacting basic dyestuffs with complex metal compounds of monoazo dyestuffs free from sulphonic acid groups and carboxyl groups not in ortho-position to an azo group and that contain one sulphonic acid amide group.

(5) Products obtained by heating a mixture of two different azo dyestuffs free from sulphonic acid groups and which are capable of forming complex metal compounds with substances yielding metal.

(6) Complex metal compounds of azo or azomethine dyestuffs free from sulphonic acid groups and that contain not more than one free sulphonic acid amide group.

(7) Metal complexes of monoazo dyestuffs of the β-naphthol series that are free from free —COOH, —SO$_3$H and —SO$_2$NH-acyl groups, but which may contain one or a plurality of substituted carboxylic amide- or alkyl-substituted sulphonamide groups.

Examples of metal-containing phthalocyanine dyestuffs that meet the above-mentioned requirements and that are suitable for the process are as follows: (1) phthalocyanines containing at least one sulfonic acid amide group whose amide nitrogen atom carries the residue of a nitrodiphenylamine free from sulfonic acid groups; (2) phthalocyanines sulphamides containing alkoxyalkylamide groupings having long-chain alkoxy groups; (3) phthalocyanine sulphamides containing low-molecular alkoxyalkylamide groupings; (4) phthalocyanine sulphamides containing phenylene diamine and alkoxyalkylamine groupings attached to the sulphamide nitrogen atom.

Possible emulsifier components for the present process are water soluble emulsifiers of non-ionic character. These emulsifiers may also be used in combination with anionic and cationic emulsifiers, though of course only inasfar as no interfering reactions with the viscose occur. The amount of emulsifier to be used may be varied within wide limits. It is however appropriate that the weight ratio of dyestuff to emulsifier should lie between 1:2 and 1:50, preferably between 1:4 and 1:10.

Important representatives of such non-ionic emulsifiers belong, in particular, to the following types of compounds:

(a) Ethers of polyhydroxy-compounds, such as polyoxalkylated fatty alcohols, polyoxalkylated polyols, polyoxalkylated mercaptans, and aliphatic amines, polyoxalkylated, alkylphenols and alkylnaphthols, polyoxalkylated alkyl-aryl-mercaptans and alkylarylamines. (b) Fatty acids esters of ethylene and polyethylene glycols, such as propylene and butylene glycol, glycerine or polyglycerines and pentaerythritol, as well as of sugar alcohols such as sorbitol, sorbitans and saccharose. (c) N-hydroxyalkylcarbonamides, polyoxalkylated carbonamides and sulphonamides.

By way of examples, the following may be quoted as emulsifiers of these groups which may be used with advantage: addition products of 8 moles of ethylene oxide to 1 mole of p-tert.-octylphenol, of 15 or 16 moles of ethylene oxide to castor oil, of 20 moles of ethylene oxide to the alcohol $C_{16}H_{33}OH$, ethylene oxide addition products to di-[α-phenylethyl]-phenols, polyethylene - tert. - dodecylthioethers, polyamine-polyglycol ether, addition products of 15 or 30 moles of ethylene oxide to 1 mole of the amines $C_{12}H_{25}NH_2$ or $C_{18}H_{37}NH_2$, and so on.

The dyestuffs solutions containing emulsifiers which are to be used for the process of the invention may be prepared according to the following method variations:

(1) Solution of the dyestuff in an organic solvent which: (a) completely dissolves the dyestuff; (b) is miscible with water in all proportions; and (c) is chemically inert to viscose, together with addition of the emulsifier.

(2) Solution of the dyestuff in the emulsifier, as long as the emulsifier fulfills the above prerequisites for a solvent, in which case one may dispense with a further solvent (through one does not have to dispense with it).

(3) Solution of the dyestuff in a solvent which is immiscible or partially miscible with water and which may be separated off by distillation, addition of the emulsifier, and distilling off of the solvent. Where a solvent which is not miscible with water is used a practically complete removal of the solvent is here necessary, and where a solvent which is partially miscible with water is used a partial removal of the solvent, corresponding to the miscibility with water, is necessary.

Obviously it is also possible to use solvent mixtures as long as they correspond to the above requirements.

The following may be quoted as examples of solvents which are infinitely miscible with water: acetone, aliphatic monohydric alcohols having 1 to 4 carbon atoms, as e.g. ethanol and the propanols, aliphatic polyhydric alcohols such as glycols, glycol monoethers such as the monomethyl ether or monobutyl ether, cyclic ethers such as dioxan or tetrahydrofuran, polyethylene glycols as long as they are liquid at room temperature, dimethyl sulphoxide, dimethylformamide, γ-butyrolactone, dihydropyrane, N-methylpyrrolidone, tetrahydromethylene sulphone, tetrahydrofurfurylamine, dimethylacetamide and similar products. Possible solvents which are immiscible with water or only miscible within limits are benzene and alkylated benzenes, halogenated benzenes, cyclohexanone, higher aliphatic alcohols, such as butanol, methyl ethyl ketone etc.

The amount of solvent to be used in determined by the nature of the dyestuff being used; generally an amount of solvent which just permits complete solution of the dyestuff, is sufficient.

The present process for the preparation of transparent dyed shaped articles is applicable to various viscose compositions based on regenerated cellulose. By the term regenerated cellulose there is here to be understood the material obtained from natural cellulose by alkalisation, sulphidising and shaping in a precipitation bath, with the viscose obtained by sulphidising and solution e.g. being processed into cables, films, bands, wires, bristles, but preferably fibres and foils. Continuous filaments or staple filaments may be produced.

Depending on the nature of desired dyeing effect and the constitution of the dyestuff, the amount of the dyestuff to be used may vary within wide limits. Normally concentrations of the dyestuff of between 0.01 and 3% by weight, preferably 0.1 to 1% by weight, calculated relative to the cellulose, are sufficient. The complete solution of the dyestuff which has been described may be added directly to the desired amount of viscose composition, normally working at room temperature, though slightly elevated or lower temperatures are not excluded. On the other hand, it is also possible to produce a concentrated stock solution of the dyestuff in the emulsifier and optionally in the organic solvent, for stock purposes. Finally it is also possible to add the solution of the dyestuff to the alkalised cellulose even before the sulphidising.

The shaping of the viscose may be carried out in a normal manner which is in itself known, e.g. through spinnerettes into a precipitation bath (e.g. a Müller bath) with optional post-treatment in further baths.

The process of the invention opens up a new way for the preparation of dyed shaped articles based on regenerated cellulose, having high transparency which results in excellent gloss, particularly in the case of filaments. Conventional spin dyeing by means of very finely ground pigments is far surpassed by the dyeings according to the present process, as far as their gloss is concerned. It was just this matting effect in the known process procedures which was an obstacle to the wider application of such spin dyeing processes. As compared to the known bath dyeing processes the present process has the great advantage that the bath dyeing has an adverse effect on the physical characteristics, such as tensile strength and break elongation, of the fibres. With the process of the invention the strength and elongation is practically indistinguishable from undyed material. In this respect the process is also superior to classical pigment dyeing where one has to take strength losses of up to 10% into account, depending on the degree of pigmentation of the fibre. The present invention is also of particular importance for the preparation of transparent dyed films, because using classical pigments transparent dyeings have hitherto only been possible in special cases using vat pigments, which had to be reduced and re-oxidised. Bath dyeing of films met with considerable process and fastness difficulties. Here again it was only possible to use dyestuffs of very good affinity, since the dyeing times are only a few seconds.

As may be seen from the above, the desired dyeings may be largely suited to the desired fastness properties in use by selecting an appropriate dyestuff, and/or fastness properties equivalent to pigment dyeing may be obtained.

In the examples which follow the parts denote parts by weight unless otherwise stated, and the percentages denote percentages by weight.

Examples 1 to 33

One of the dyestuff solutions described under 1 to 16 is stirred into 987 parts of ripened ready-to-spin viscose the content of which corresponds to 75 parts of cellulose. Thereafter the viscose is spun into continuous filaments, in the usual manner, with the aid of a precipitation bath containing sulphuric acid. The fibres are subsequently washed in post-treatment baths (e.g. water), desulphurised (e.g. by means of dilute aqueous solutions of sodium sulphide and caustic soda), washed and brightened. Fbres of excellent gloss are obtained.

(1) 1 part of the dyestuff of formula:

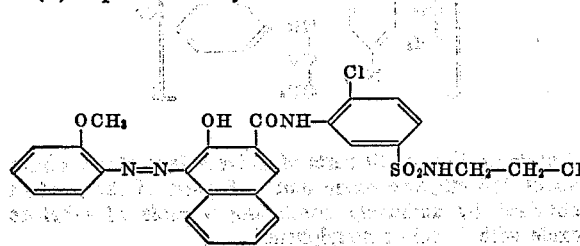

10 parts of dioxan and 8 parts of the addition product of 8 moles of ethylene oxide to 1 mole of p-tert.-octylphenol.

(2) 1 part of the dyestuff of formula:

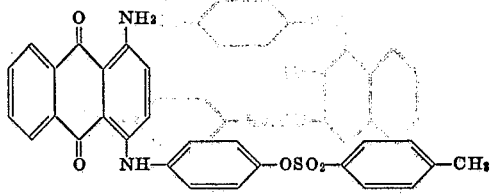

15 parts of n-propanol and 10 parts of the addition product of 9 moles of ethylene oxide to 1 mole of nonylphenol.

(3) 0.3 part of 5-benzoylaminoisothiazolanthrone, 10 parts of dioxan, 8 parts of polyethylene glycol (consisting of about 350 ethylene oxide units), and 15 parts of the addition product of 8 moles of ethylene oxide to 1 mole of p-tert.-octylphenol.

(4) 0.5 part of the dyestuff of formula:

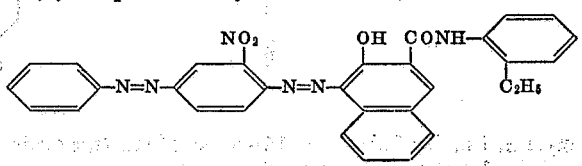

10 parts of tetrahydrofuran and 10 parts of the addition product of 9 moles of ethylene oxide to 1 mole of nonylphenol.

(5) 1 part of nigrosine, and 10 parts of the addition product of 8 moles of ethylene oxide to 1 mole of p-tert.-octylphenol.

(6) 1 part of nigrosine, 10 parts of acetone, 8 parts of the condensation product of 2 moles of styrene, 1 mole of phenol and 10 moles of ethylene oxide.

Instead of acetone the following solvents may also be used: methyl alcohol, ethyl alcohol, isopropyl alcohol, dimethyl sulphoxide, dimethylacetamide, γ-butyrolactone, or dihydropyrane.

(7) 1 part of nigrosine, 10 parts of acetone, and 8 parts of the addition product of 5 moles of ethylene oxide to 1 mole of p-nonylphenol.

(8) 1 part of nigrosine, 10 parts of acetone and 8 parts of the condensation product of 1 mole of coconut oil fatty acid with 2 moles of diethanolamine.

(9) 1 part of the dyestuff of formula:

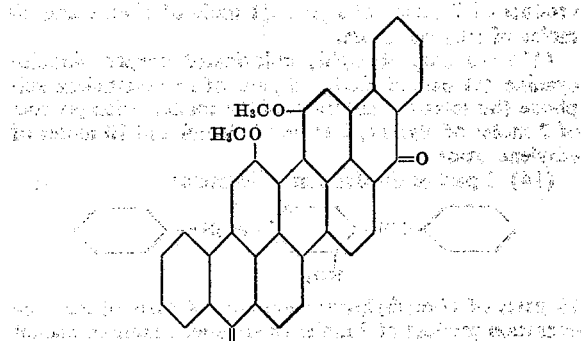

10 parts of dimethylformamide, and 8 parts of the condensation product of 2 moles of styrene, 1 mole of phenol and 10 moles of ethylene oxide.

(10) 0.5 part of dyestuff of formula:

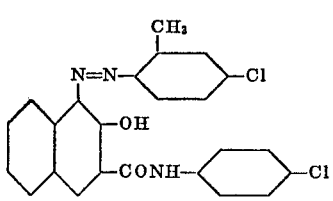

9 parts of N-methylpyrrolidone, 1 part of alcoholic KOH, and 8 parts of the condensation product of 2 moles of styrene, 1 mole of phenol and 10 moles of ethylene oxide.

(11) 1 part of the dyestuff of formula:

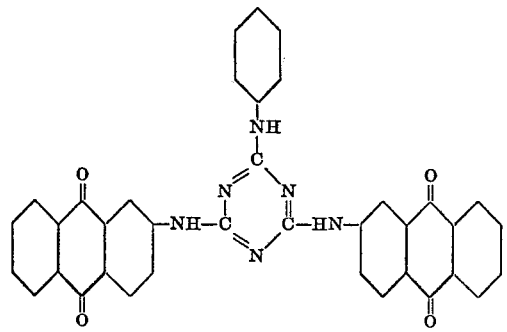

10 parts of N-methylpyrrolidone, and 8 parts of the condensation product of 2 moles of styrene, 1 mole of phenol and 10 moles of ethylene oxide.

(12) 0.5 part of sulphur dyestuff from 2,4-dinitrotoluene and benzidine, 9 parts of N-methylpyrrolidone, 1 part of alcoholic KOH, and 8 parts of the condensation product of 2 moles of styrene, 1 mole of phenol and 10 moles of ethylene oxide.

(13) 0.3 part of highly chlorinated copper phthalocyanine, 0.1 part of KOH, 10 parts of tetramethylene sulphone (Sulfolan), and 8 parts of the condensation product of 2 moles of styrene, 1 mole of phenol and 10 moles of ethylene oxide.

(14) 1 part of the dyestuff of formula:

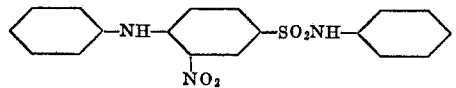

10 parts of N-methylpyrrolidone and 8 parts of the condensation product of 2 moles of styrene, 1 mole of phenol and 10 moles of ethylene oxide.

(15) 1.0 part of the dyestuff of formula:

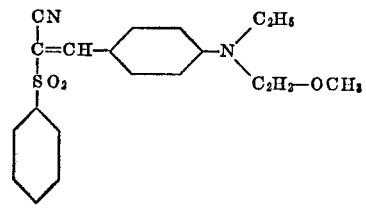

9 parts of N-methylpyrrolidone, 1 part of alcoholic KOH and 8 parts of the condensation product of 2 moles of styrene, 1 mole of phenol and 10 moles of ethylene oxide.

(16) 0.5 part of the dyestuff of formula:

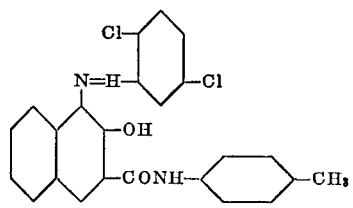

9 parts of N-methylpyrrolidone, 1 part of alcoholic KOH, and 8 parts of the condensation product of 2 moles of styrene, 1 mole of phenol and 10 moles of ethylene oxide.

(17) 0.5 part of the dyestuff of formula:

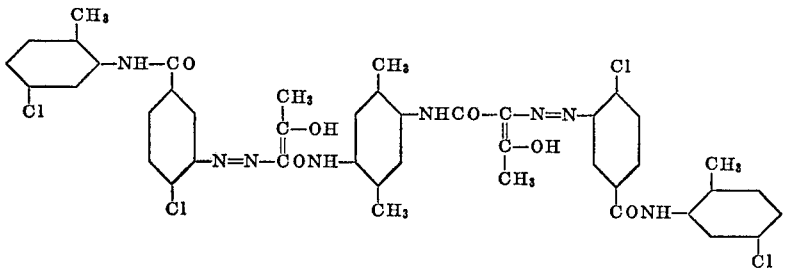

9 parts of tetrahydrofurfurylamine, 1 part of alcoholic KOH and 8 parts of the condensation product of 2 moles of styrene, 1 mole of phenol and 10 moles of ethylene oxide.

(18) 1 part of the dyestuff of the formula:

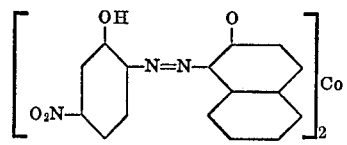

10 parts of dioxan, 8 parts of the product obtained by additively combining 30 mols of ethylene oxide with 1 mol of stearylamine. It is also possible to use tetrahydrofurfurylamine or tetramethylenesulfone instead of dioxan.

(19) 1 part of the dyestuff of the formula:

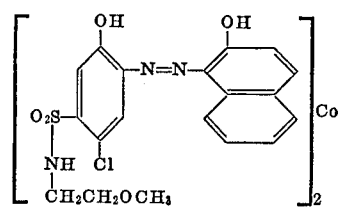

10 parts of acetone, 8 parts of the product obtained by additively combining 8 mols of ethylene oxide with 1 mol of paratertiary-octylphenol.

(20) 0.5 part of the dyestuff of the formula:

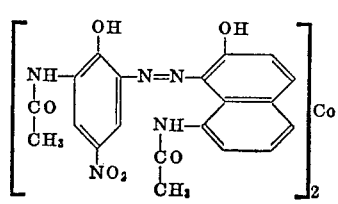

5 parts of dioxan, 10 parts of polyethylene glycol (from about 350 ethylene oxide units), 8 parts of the product obtained by additively combining 9 mols of ethylene oxide with 1 mol of nonylphenol.

(21) 1 part of the dyestuff of the formula:

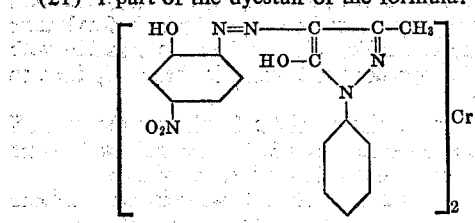

10 parts of dioxan, 10 parts of the product obtained by additively combining 20 mols of ethylene oxide with cetyl alcohol. Instead of dioxane, it is also possible to use the following solvents: methyl alcohol, ethyl alcohol, isopropyl alcohol, dimethyl sulphoxide, dimethyl formamide, dimethylacetamide, N-methylpyrrolidone, γ-butyrolacetone, di-hydropyran.

(22) 1 part of the guanidine salt of the mixed-complex dyestuff of the formula:

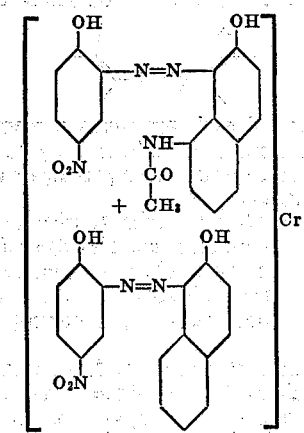

10 parts of n-propanol, 8 parts of the product obtained by additively combining 30 mols of ethylene oxide with 1 mol of stearylamine.

(23) 1 part of the dyestuff of the formula:

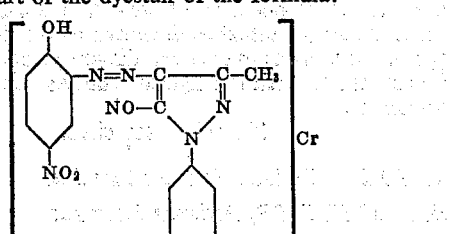

8 parts of tetrahydrofuran and 10 parts of the product obtained by additively combining 15 mols of ethylene oxide with castor oil.

(24) 1 part of the dyestuff of the formula:

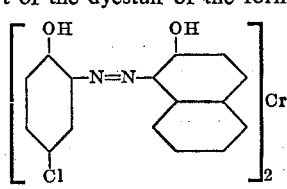

10 parts of the product obtained by additively combining 8 mols of ethylene oxide with 1 mol of para-tertiary octyl phenol.

(25) 1 part of the dyestuff of the formula:

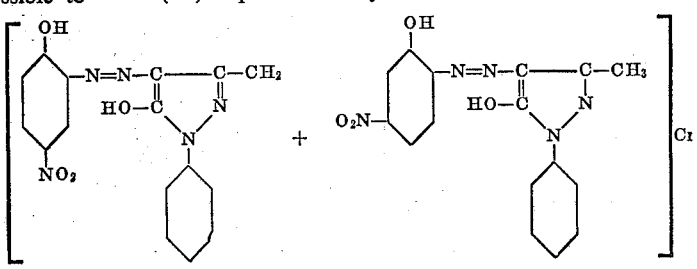

10 parts of the product obtained by additively combining 9 mols of ethylene oxide with 1 mol of nonylphenol.

(26) 1 part of the dyestuff of the formula given in Example 4, 10 parts of acetone and 8 parts of the product obtained by additively combining 5 mols of ethylene oxide with 1 mol of para-nonylphenol.

(27) 1 part of the dyestuff of the formula given in Example 4, 10 parts of acetone and 8 parts of the product obtained by condensing 1 mol of coconut oil fatty acid with 2 mols of diethanolamine.

When the solutions indicated in the above examples are stirred into viscose as used in the production of viscose films and films are produced under conditions normally obtaining in industrial practice, the films so obtained display an excellent degree of transparency. The degree of transparency they show is normally obtainable only by bath-dyeing. Their fastness properties are superior to those of most bath-dyed films.

(28) 1 part of the dyestuff of the formula
Cu-phthalocyanine-[—$SO_2NHCH_2CH_2CH_2OCH(CH_3)_2$]$_{3-4}$ 10 parts of acetone and 8 parts of the product obtained by additively combining 8 mols of ethylene oxide with 1 mol of para-tertiary-octylphenol. Intead of acetone it is also possible to use methanol, ethanol, isopropanol, dimethyl sulfoxide, dimethyl formamide, dimethylacetamide, N-methylpyrrolidone, γ-butyrolacetone or dihydropyran.

(29) 0.5 part of the dyestuff of the formula

Cu-phthalocyanine-(—$SO_2NHCH_2CH_2CH_2$—$OC_{12}H_{25}$)$_{3-4}$ 15 parts of dioxan, and 10 parts of the product obtained by additively combining 9 mols of ethylene oxide with 1 mol of nonylphenol.

(30) 1 part of the dyestuff of the formula:

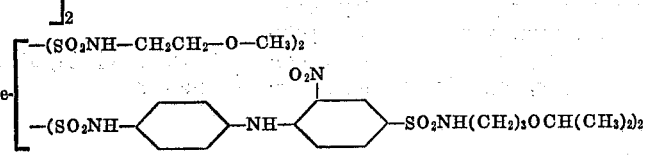

15 parts of n-propanol and 8 parts of the product obtained by additively combining 15 mols of ethylene oxide with 1 mol of laurylamine.

(31) 1 part of the dyestuff of the formula:

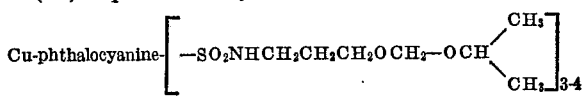

15 parts of dioxan and 8 parts of the product obtained by additively combining 9 mols of ethylene oxide with 1 mol of nonylphenol. Instead of dioxan, it is also possible to use the tetrahydrofurfurylamine or tetramethylenesulfone.

(32) 1 part of the dyestuff of the formula indicated in Example 30, 10 parts of acetone and 8 parts of the product obtained by additively combining 5 mols of ethylene oxide with 1 mol of para-nonylphenol.

(33) 1 part of the dyestuff of the formula indicated in Example 28, 10 parts of acetone and 8 parts of the product obtained by condensing 1 mol of coconut oil fatty acid with 2 mols of diethanolamine.

When the solutions indicated in the above examples are stirred into viscose as used in the production of viscose films and films are produced under conditions normally obtaining industrial practice, the films so obtained display an excellent degree of transparency. The degree of transparency they show is normally obtainable only by bath-dyeing. Their fastness properties are superior to those of most bath-dyed films.

I claim:
1. Process for the preparation of transparently dyed, shaped articles based on regenerated cellulose, which process comprises submitting to precipitation and shaping a viscose composition to which has been added before precipitation and shaping of the cellulose a solution containing:
(A) in an amount of 0.01 to 3% calculated on the weight of the cellulose, an organic dyestuff selected from the group consisting of anthraquinone dyestuffs, anthrone derivatives and azine dyestuffs being free from free —$SO_3H$ and —COOH groups, 1:2 metal-complex dyestuffs which are at most dispersible in water, and of water-dispersible metal phthalocyanine dyestuffs with the metal being selected from the group consisting of Cu, Ni, Co, said organic dyestuff being soluble in an organic solvent selected from the group consisting of acetone, ethanol, the propanols, glycols, glycolmonoethyl ether, glycolmonobutyl ether, dioxan, tetrahydrofuran, polyethylene glycols as long as they are liquid at room temperature, dimethyl sulfoxide, dimethyl formamide, γ-butyrolactone, dihydropyrane, N-methylpyrrolidone, tetrahydromethylene sulfone, tetrahydrofurfurylamine, dimethylacetamide, benzene, alkylated and halogenated benzenes, cyclohexanone, butanol and methyl ethyl ketone,
(B) a water-soluble non-ionic emulsifier selected from the group consisting of ethers of polyhydroxy compounds, fatty acid esters of ethylene and polyethylene glycols, N-hydroxyalkyl-carbonamides, polyoxyalkylated carbonamides and sulfonamides, and
(C) calculated on the quantity of emulsifier, zero to 50% of water, the weight ratio between dyestuff and emulsifier being between 1:2 and 1:50.

2. Process according to claim 1, wherein the dyestuff solution contains an organic solvent for the dyestuff up to an amount which permits complete solution of the dyestuff selected from the group consisting of acetone, ethanol, the propanols, glycols, glycol-monomethyl ether, glycolmonobutyl ether, dioxan, tetrahydrofuran, polyethyleneglycols as long as they are liquid at room temperature, dimethyl sulfoxide, dimethylformamide, γ-butyrolacetone, dihydropyrane, N-methylpyrrolidone, tetrahydromethylene sulfone, tetrahydrofurfurylamine and dimethylacetamide, which solvent is miscible with water in all proportions and which is chemically inert to the viscose.

3. Process according to claim 1, wherein the dyestuff is dissolved in an emulsifier which is miscible with water in any proportion and which is inert to viscose.

4. Process according to claim 1, wherein the non-ionic emulsifier is an ether of a polyhydroxy compound.

5. Process according to claim 1, wherein the dyestuff is a dispersion dyestuff of the anthraquinone series.

6. Process according to claim 1, wherein the dyestuff is a metal-complex azo dyestuff of the formula:

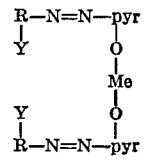

in which Me represents a divalent metal, pyr—O represents the residue of a 5-hydroxy-2-pyrazoline, R represents the radical of a diazotizable aryl-amine and Y, singly, represents a hydrogen atom and the two symbols Y as one unit represent a second disazo group of the formula —N=N—pyr—O—Me—O—pyr—N=N—

7. Process according to claim 1, wherein the dyestuff is a metal-complex azo dyestuff containing the grouping:

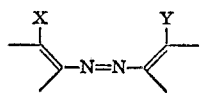

in which X and Y each represents a member selected from the group consisting of a hydroxyl group, a carboxyl group and an amino group which participate in the formation of the complex.

8. Process according to claim 1, wherein the dyestuff is a 1:2 cobalt or chromium complex dyestuff.

9. Process according to claim 1, wherein the dyestuff is a dyestuff of the phthalocyanine series containing a metal selected from the group consisting of Cu, Co and Ni.

10. Process according to claim 1, wherein the dyestuff is a metal-containing dyestuff of the phthalocyanine series substituted by sulphamide groups containing alkoxyalkylamide groupings having long chain alkoxy groups.

11. Process according to claim 1, wherein the dyestuff solution additionally contains an organic solvent selected from the group consisting of acetone, ethanol, the propanols, lower monoethers of glycol, dioxan, tetrahydrofuran, dimethyl sulfoxide, dimethylformamide, N-methylpyrrolidone, γ-butyrolactone, dihydropyran, tetrahydrofurfurylamine, tetramethylene sulfone and dimethylacetamide.

No references cited.

MORRIS LIEBMAN, Primary Examiner

H. H. FLETCHER, Assistant Examiner

U.S. Cl. X.R.

8—4, 39, 42, 34, 51, 54.2, 85, 88, 91, 93, 94; 106—165; 264—78